US012801845B2

(12) United States Patent

Lamba

(10) Patent No.: US 12,801,845 B2

(45) Date of Patent: Nov. 17, 2026

(54) ACCELERATED CONTRACT INGESTION AND PROCESSING OF CONTRACT DOCUMENTS USING LARGE LANGUAGE MODELS

(71) Applicant: International Business Machines Corporation, Armonk, NY (US)

(72) Inventor: Rahul Lamba, Miami, FL (US)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 18/788,677

(22) Filed: Jul. 30, 2024

(65) Prior Publication Data

US 2026/0037724 A1 Feb. 5, 2026

(51) Int. Cl.

*G06F 40/205* (2020.01)
*G06F 8/51* (2018.01)
*G06F 16/35* (2019.01)
*G06F 40/186* (2020.01)
*G06F 40/289* (2020.01)
*G06F 40/40* (2020.01)
*G06V 30/19* (2022.01)

(52) U.S. Cl.

CPC .............. *G06F 40/205* (2020.01); *G06F 8/51* (2013.01); *G06F 16/35* (2019.01); *G06F 40/186* (2020.01); *G06F 40/289* (2020.01); *G06F 40/40* (2020.01); *G06V 30/19* (2022.01)

(58) Field of Classification Search

None

See application file for complete search history.

(56) References Cited

U.S. PATENT DOCUMENTS

| | | | | |
|---|---|---|---|---|
| 8,958,605 | B2 * | 2/2015 | Amtrup | G06F 40/00 382/218 |
| 11,861,320 | B1 * | 1/2024 | Gajek | G06F 40/40 |
| 12,437,154 | B1 * | 10/2025 | Cirelli | G06F 40/289 |
| 2020/0175097 | A1 * | 6/2020 | Govindappa | G06F 16/93 |
| 2020/0364801 | A1 * | 11/2020 | Basra | G06F 40/40 |
| 2024/0370479 | A1 * | 11/2024 | Hudetz | G06F 16/316 |
| 2024/0427985 | A1 * | 12/2024 | Vavrovsky | G06Q 50/18 |
| 2025/0037222 | A1 * | 1/2025 | Oluleye | G06Q 50/18 |
| 2025/0124232 | A1 * | 4/2025 | Kusch | G06F 40/205 |
| 2025/0148020 | A1 * | 5/2025 | Padmashali | G06F 16/93 |
| 2025/0156639 | A1 * | 5/2025 | Sinha | G06V 30/416 |
| 2025/0165702 | A1 * | 5/2025 | Nakano | G06F 40/169 |
| 2025/0191480 | A1 * | 6/2025 | Padilla | G06Q 30/018 |

(Continued)

*Primary Examiner* — Douglas Godbold

(74) *Attorney, Agent, or Firm* — Cantor Colburn LLP; Maeve Carpenter

(57) ABSTRACT

Systems and methods are described for processing contract documents. In an example, an application can identify text in an image-based data file that contains text of a contract. The application can segment text in the document into smaller units. The application can then create vector embeddings for each unit and feed the vector embeddings into a first large language model ("LLM") that classifies each unit. Based on the classification, the application can retrieve a prompt template for each unit and feed the vector embeddings with their corresponding prompt into a second LLM. The second LLM can extract specific data from each unit based on the prompt template. The output from the second LLM can then be converted into a useable format, such as a web page or passed to another system.

17 Claims, 7 Drawing Sheets

(56) References Cited

U.S. PATENT DOCUMENTS

| | | | | |
|---|---|---|---|---|
| 2025/0200296 | A1* | 6/2025 | Li | G06F 40/40 |
| 2025/0217799 | A1* | 7/2025 | Ahmad | G06N 3/08 |
| 2025/0238607 | A1* | 7/2025 | Turner | G06F 40/186 |
| 2025/0259010 | A1* | 8/2025 | Srinivasa | G06F 11/3428 |
| 2025/0308278 | A1* | 10/2025 | Anthony | G06V 30/412 |
| 2026/0017451 | A1* | 1/2026 | Roper, Jr. | G06F 40/186 |

* cited by examiner

ACCELERATED CONTRACT INGESTION AND PROCESSING OF CONTRACT DOCUMENTS USING LARGE LANGUAGE MODELS

BACKGROUND

In the realm of legal and business operations, contract documents play a crucial role in defining the terms and conditions of agreements between parties. These documents often contain a wealth of information, including clauses, obligations, rights, and other legal provisions. However, processing large contract documents presents significant challenges, especially when it comes to extracting and presenting data in a meaningful way or transferring it to other systems.

One of the primary difficulties in processing contract documents lies in their complexity and length. Large contracts may consist of hundreds or even thousands of pages, each containing dense legal language and intricate details. For example, contract documents related to construction contracts can include hundreds or thousands of line-items that may follow different formats. This complexity makes it challenging to quickly identify and extract specific pieces of information that are relevant to a particular context or requirement.

Moreover, contracts often contain information that is interrelated and context-dependent. Clauses and provisions in one section of the document may reference or be influenced by content in another section, requiring a comprehensive understanding of the entire document to accurately interpret any single part. This interconnectedness adds an additional layer of complexity to the processing of contract documents.

Another challenge is the variability in the format and structure of contracts. Different organizations, industries, and legal jurisdictions may have varying standards and templates for contract documents. This lack of standardization makes it difficult to develop a one-size-fits-all approach to processing contracts, requiring adaptable and flexible processing systems.

Furthermore, the need to present extracted data in a meaningful way or transfer the data to other systems adds another layer of complexity. It is not enough to simply extract information; it must be organized, summarized, or transformed in a way that is useful for the intended purpose, whether that be for analysis, reporting, compliance checks, or integration into other software systems.

In light of these challenges, there is a clear need for innovative solutions that can effectively process large contract documents, extract relevant information, and present or transfer it in a meaningful and useful manner.

SUMMARY

Examples described herein include systems and methods for processing contract documents. The embodiments disclosed herein overcome the challenges described in the prior art by improving computer systems, including making the computer systems more efficient and eliminating wasted computer resources by improved processing of nonstandard contract document pages. An application is introduced that can interpret and parse contract documents, including nonstandard pages of contract documents. For example, the application described herein can identify and parse mandatory government clauses and Section B clauses of a government contract. Mandatory government clauses are clauses in all government construction contracts that afford the government special contractual rights. Section B clauses enumerate all the supplies, data, and services that are intended to be acquired. The application can extract data from the clauses and present the data in a user-friendly manner in a graphical user interface ("GUI").

In an example, a contract document can be uploaded to the application. For example a user can upload a contract document using the GUI or a third-party server can send the contract document to the application. A contract document can be an image-based digital file, such as a .pdf, .jpeg., or., .png file, that includes an image of text for a contract or form. After receiving the document, the application can parse text in the document. If the document already contains recognizable text, then the application can read and analyze the text directly. For any images containing text, the application can perform image text extraction, also referred to as optical character recognition ("OCR").

Some contract documents have one or more pages with standard formatting and other pages without standard formatting. The application can be configured to process standard formatted pages differently from nonstandard formatted pages. For example, the application can extract an identifier ("ID") from the first page of the document that identifies the document type. The application can cross-reference the ID with known document IDs and retrieve a template corresponding to the document's ID. The template can indicate where certain fields are located on the standard formatted page, and the application can use this template to extract values for those fields.

For nonstandard formatted pages, the application can segment the text into smaller units to prepare the text for processing in a large language model ("LLM"). The application can do this by chunking the data. Data chunking is a technique used to manage and process large datasets by dividing them into smaller, more manageable pieces called "chunks." This approach can be particularly useful when working with data that is too large to fit into memory. For example, many LLMs have a limit to the number of tokens that can be used before the model begins to lose context. To prevent this, the application can chunk the data into smaller segments so that each chunk can maintain its context to the LLM.

The application can then create vector embeddings of the chunks. The primary objective of the vector embeddings is to encapsulate the semantic relationships between the objects in the chunked data. The vector embeddings are numerical representations of the chunks that are represented in a vector space where words that are semantically similar or related in meaning should be positioned closer together in the vector space, while those that are unrelated should be farther apart. LLMs understand numerical representations and not raw text, so the vector embeddings allow an LLM to understand the chunks that are fed into the LLM as input.

The application can feed the vector embeddings of the chunks into a first LLM that categorizes the chunks. For example, the first LLM can be trained to identify clauses or line-items and categorize them as mandatory government clauses or Section B clauses. The categorizations output by the LLM are numerical and are therefore useable by other LLMs.

The application can then take each categorized clause and feed the vector embeddings and categorizations for each chunk into a second LLM model that is trained to extract certain data from a clause based on its category. In an example, the application can use prompt templates. A prompt template is a template used to elicit specific responses from an LLM. The application can select a prompt template based on a clause's determined category and feed the selected prompt template with the chunk's vector embeddings into the second LLM. Each prompt template and chunk can be individually inputted into the second LLM, allowing it to maintain a high level of contextual awareness.

The second LLM can output a string with values for fields elicited by the prompt template. The output can be in any appropriate format, such as a JavaScript Object Notation ("JSON") script. The application can then convert the script into a useable object, such as a JSON object. The JSON object can then be used in various ways. In one example, the application can input the JSON object into a Hypertext Markup Language ("HTML") file that can be used to display a web page with the data. In another example, the application can export the JSON object to another application. For example, the application can insert the JSON object into an Application Programming Interface ("API") call and send the object to an enterprise resource planning ("ERP") application, such as SYSTEM APPLICATIONS AND PRODUCTS IN DATA PROCESSING ("SAP").

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Figure 1:
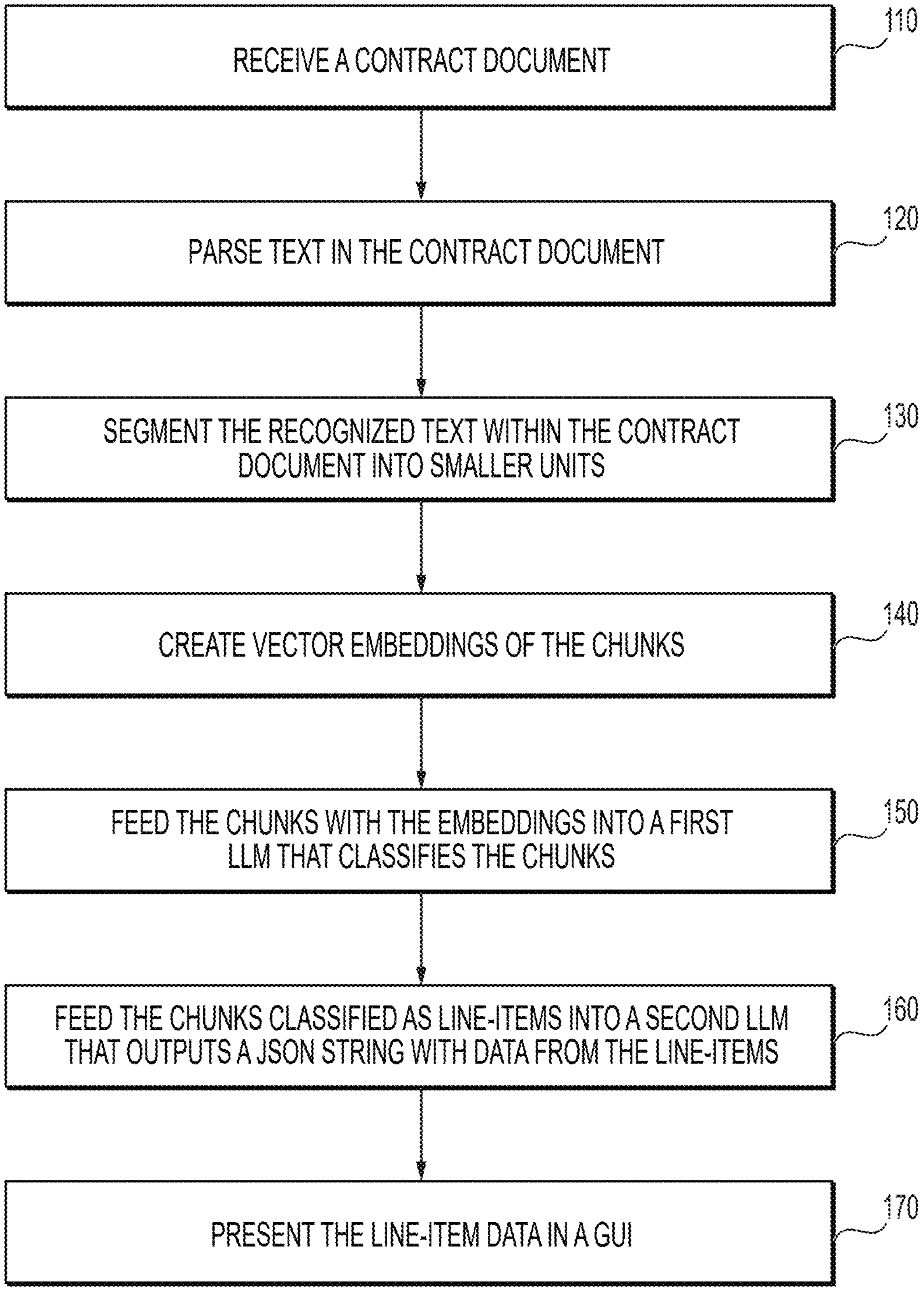
FIG. 1 is a flowchart of an example method for processing a contract document.

FIG. 1 is a flowchart of an example method for processing a contract document (referred to interchangeably hereinafter as simply the "document"). At stage 110, an application can receive a contract document. The contract document can be an image-based digital file, such as a .pdf, .jpeg., or., .png file, that includes an image of text for a contract or form. The contract can be received through any available mechanism. For example, the application can include a GUI where a user can upload the contract document. Alternatively, the contract document can be received from another computing system through a communication protocol, such as an API call.

At stage 120, the application can parse text in the contract document. Parsing the document can refer to analyzing and extracting information from both the textual and visual components of the document. This can include multiple steps. One step can be text extraction, which is where text is extracted from the document itself. If the document already contains recognizable text, then the application can read and analyze the text directly. Another step can include OCR. If the document contains images with text (such as photographs, scanned documents, or embedded graphics with text), OCR technology can be used to convert the text within these images into machine-readable text. OCR software analyzes the image, identifies characters and words, and then converts them into a text format that can be processed further. Once the text is extracted from both the document and the images, it can be parsed in the usual way, which involves breaking the text down into manageable elements (like sentences, words, or tokens) and analyzing its structure and meaning.

At stage 130, the application can segment the recognized text within the document into smaller units. The application can do this by chunking the data. Data chunking is a technique used to manage and process large datasets by dividing them into smaller, more manageable pieces called "chunks." This approach can be particularly useful when working with data that is too large to fit into memory. For example, many LLMs have a limit to the number of tokens that can be used before the model begins to lose context. To prevent this, the application can chunk the data into smaller segments so that each chunk can maintain its context to the LLM.

At stage 140, the application can create vector embeddings of the chunks. The primary objective of the vector embeddings is to encapsulate the semantic relationships between the objects in the chunked data. In other words, the embeddings aim to capture the underlying meanings and associations of the words, sentences, or other objects in a way that reflects their contextual relationships. For instance, words that are semantically similar or related in meaning should be positioned closer together in the vector space, while those that are unrelated should be farther apart.

By converting the text into this numerical form, the data becomes more amenable to analysis by machine learning algorithms. Machine learning algorithms, which are designed to identify patterns and make predictions based on data, can more effectively process and interpret the numerical representations provided by vector embeddings. This enables the application to perform various tasks, such as text classification, sentiment analysis, or information retrieval, with a higher degree of accuracy and efficiency. Converting the chunked data into embeddings allows the data to be fed into an LLM. This is because LLMs understand numerical representations and not raw text.

In an example, the application can create vector embeddings by feedings the chunks into a vector embedding model. The vector embedding model can be a part of the application or provided by a separate service, such as a third-party provider.

At stage 150, the application can feed the chunks with the embeddings into a first LLM that classifies the chunks. The first LLM can be a model trained to classify data chunks into certain predefined categories. For example, contracts typically include various types of clauses, and the first LLM can be trained on those types. As an example, government construction contracts typically contain mandatory government clauses (also known as "acquisition.gov clauses"), Section B clauses, and line-items. The chunks can be fed individually into the LLM so that they retain their context, and the LLM can classify the data in each chunk.

At stage 160, the application can feed the chunks classified as line-items into a second LLM that outputs a JSON string with data from the line-items. The second LLM can be trained to extract and classify data from line-items. For example, the second LLM can extract item numbers, item types, descriptions, quantities, units of measurement, unit prices, and so on. The LLM can output a JSON string with the fields and corresponding value for each type of data in the line-item. In an example, the application can feed the chunks into the second LLM using a line-item prompt template. The line-item prompt template can elicit specific line-item fields. For each, the line-item prompt template can prompt the second LLM to identify and extract the fields described above.

At stage 170, the application can present the line-item data in a GUI. The GUI can display a list of all the line-items extracted from the document, and a user can select a line-item to view values of extracted fields from the line-item. An example of such a GUI is described later herein regarding FIGS. 4 and 5.

The application can perform certain operations to prepare the data for the GUI. For example, the application can use a JSON output parser to convert the JSON string into a fully structured JSON object. The application can then insert the JSON object into a HTML template that can be used to display a web page with the data.

Figure 2:
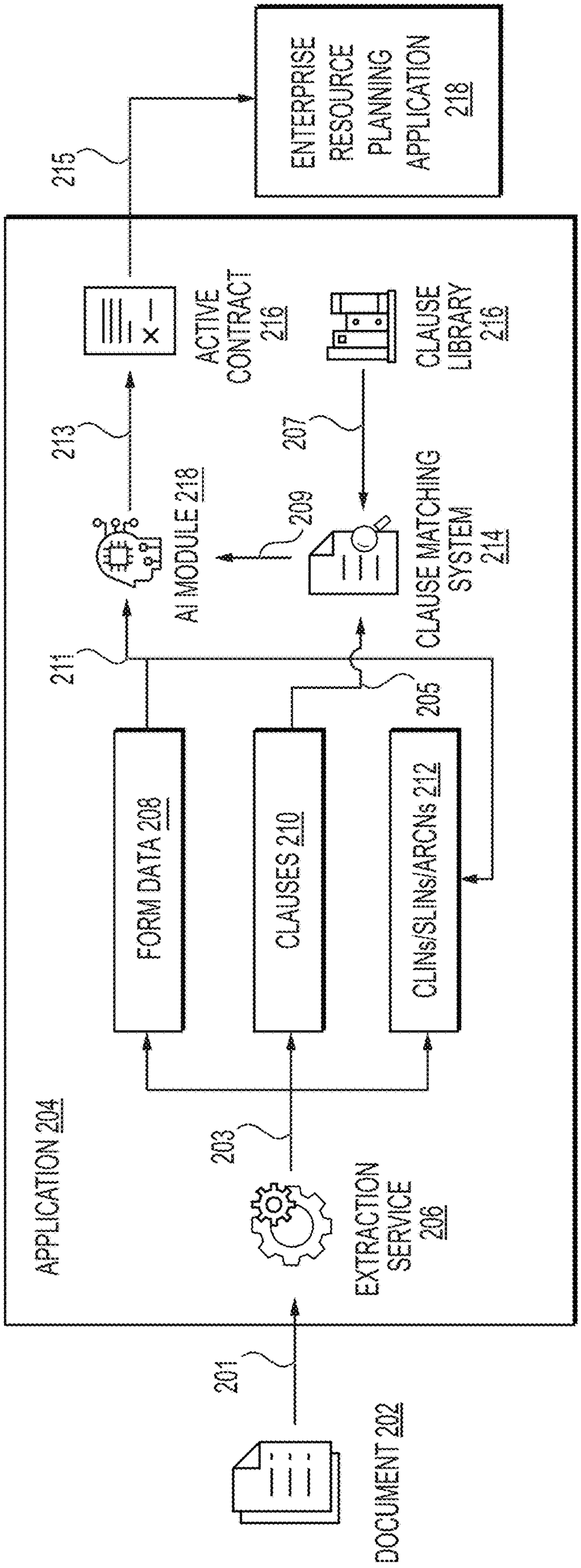
FIG. 2 is another flowchart of an example method for processing a contract document.

FIG. 2 is another flowchart of an example method for processing a contract document. At stage 201, a contract document 202 can be uploaded into an application 204. The contract document 202 can be an image-based digital file of a contract or form. For example, the contract document 202 can be a standard government contract form, such as an Aware/Contract form ("SF26"), a Solicitation, Offer, and Award form ("SF33"), or an Amendment of Solicitation/Modification of Contract form ("SF30"). The contract document 202 can be any image-based digital file, such as a .pdf, .jpeg., or., .png file.

The contract document 202 can be uploaded using any available method. In one example, the application 204 can include a feature that allows a user to upload a contract document 202. In other example, application 204 can receive the contract document 202 from another application, such as an ERP application through an API call.

At stage 203, an extraction service 206 can parse contract document 202. Parsing the contract document 202 can include analyzing the structure and content of the contract document 202 to extract meaningful information. This can include breaking down the document into its individual components, such as text, images, fonts, and metadata, and interpreting their relationships. The extraction service 206 can parse the contract document 202 using its own algorithms or using third-party or open source programming libraries and tools. Some examples of such programming libraries and tools can include pdfplumber, PaddleOCR, and other optical character recognition ("OCR") tools.

The extraction service 206 can be trained to identify a form that the contract document 202 corresponds to using the extracted components. For example, the extraction service 206 can include a trainable AI algorithm that can identify a form ID on the first page of the contract document 202. The extraction service 206 can have access to a library that includes data related to each known form type. In an example, the library can be created and the AI algorithm can be trained using the library before the contract document 202 is processed.

The extraction service 206 can use data from the library to classify other extracted components of the contract document 202. For example, the contract document 202 can include various clauses, and each clause can include various categories, such as form data 208, a clause title 210, and one or more IDs 212. Form data 208 can refer to a data related to clause type. The clause 210 can refer to written text of the clause itself. The IDs 212 can refer to specific IDs associated with the clause, such as contract line-items ("CLINs"), subline-item numbers ("SLINs"), and accounting classification reference numbers ("ACRNs"). The extraction service 206 can be trained to identify the components of each individual clause and insert them into a structured data format based on their determined categories, such as a JSON file or Extensible Markup Language ("XML") file.

At stage 205, the application 204 can insert the clauses 210 into a clause matching system 214. The clause matching system 214 can match the clause to known clauses from a clause library 216 at stage 207. For example, for government contracts, the clause matching 214 can retrieve a library of government clauses from a government source, such as the website acquisition.gov. Section B clauses enumerate all the supplies, data, and services that are intended to be acquired. The clause matching system 214 can then determine whether a clause 210 is a mandatory government clause, a section B clause, or some other type of clause.

At stage 209, the application 204 can insert the clause data into an AI module 218. At stage 211, application 204 can insert the forms data 208 and IDs 212 into the AI module 218. The AI module 218 can be a software service that feeds input in one or more LLMs. For example, the AI module 218 can configure the form data 208, the clauses 210, and the IDs 212 using a prompt template. A prompt template is a template used to elicit specific responses from an LLM. The LLM can output the processed data. In one example, the processed data can be a JSON string with specific data extracted.

At stage 213, the application 204 can process the output from the LLM. For example, the application 204 can use a JSON output parser to convert the JSON string into a fully structured JSON object. This conversion allows the extracted data to be integrated into an API, facilitating its utilization in downstream applications and systems. This fully structured JSON object, illustrated by the active contract 216, can then be fed to an ERP application at stage 215. ERP is a type of software system that helps organizations automate and manage core business processes, such as SAP. In an example, the application 204 can insert the JSON object into an API call for the ERP application.

Figure 3A:
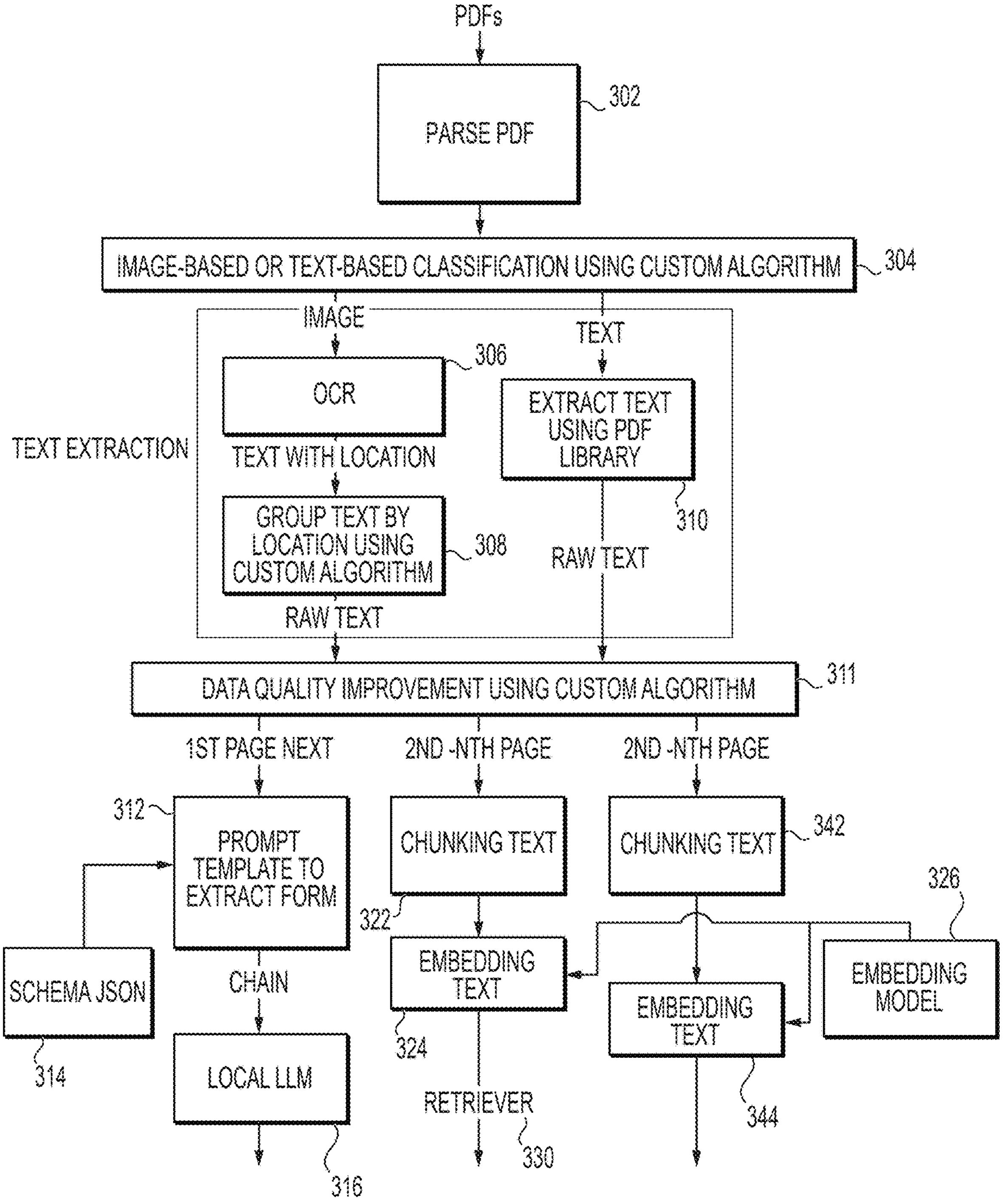
FIGS. 3A and 3B are another flowchart of an example method for processing a contract document.
Figure 3B:
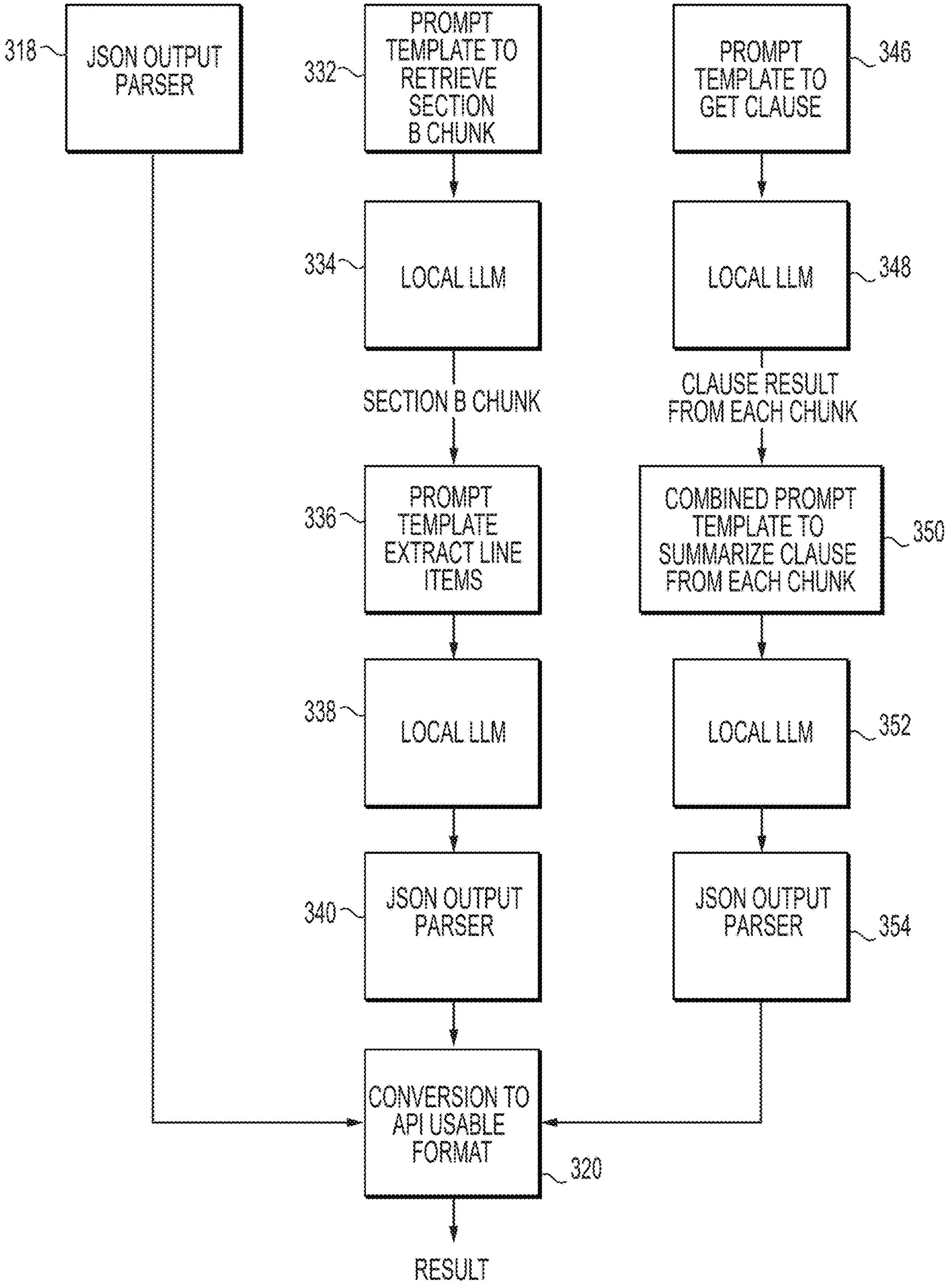

FIGS. 3A and 3B are another flowchart of an example method for processing a contract document. At stage 302, an application can parse a contract document. Parsing the document can include analyzing the structure and content of the document to extract meaningful information. This can include breaking down the document into its individual components, such as text, images, fonts, and metadata, and interpreting their relationships.

Stages 304, 306, 308, and 310 can occur as part of the parsing process of stage 302. For example, at stage 304 the application can determine whether an image-based or text-based classification of the document's contents is required. As an example, if the parsed document is limited to plain text, then the application can proceed to stage 310 where it extracts the text. The application can extract the text using any available method, such as by using a text library or an OCR tool.

If the document contains images, such as tables, then the application can proceed to stage 306 where it can first recognize text in the document and then, at stage 308, attempt to group text from different areas of the document. For example, the application can first perform an OCR on the document to recognize text. The application can then group text by location and create correlations based on those locations. The application can create correlations using an internal or third-party algorithm or tool.

At stage 311, the application can begin a process for improving the quality of the extracted text so that it can be provided to users or ERP applications in a meaningful way. The application can have the capability to handle specific pages in predefined manners. For example, the initial page(s) of many forms and contracts have a standard format, whereas the format of subsequent pages can vary. The stages beginning at stage 312 illustrate the processing of a page of the document with standard formatting.

Beginning at stage 312 with the processing of a page with standard formatting, the application can process the data using templates. For example, the application can have access to a database with templates for known forms. The templates can be schemas, such as JSON or XML schemas. The schemas can be mapped to an ID of the corresponding form. When processing a document, the application can extract the form's ID and use the mapping to retrieve the appropriate template at stage 314. The template indicates to the application where each specific field is located on the page.

The application can use the template to chunk data in the document. Chunking refers to an NLP technique where text is broken down into syntactically correlated units, or chunks. These chunks usually consist of words and their associated parts of speech, and they help extract meaningful information from the text. Chunking the text can be a multiple step process. For example, the application can first tokenize the input text into individual words or tokens. Each token can then be assigned a part-of-speech tag, indicating its grammatical category (noun, verb, adjective, etc.). Based on the part-of-speech tags, the application can then identify and group together tokens that form meaningful phrases or chunks. These can be noun phrases, verb phrases, and so on. Once chunks are identified, the extracted information from these chunks can be used for various NLP tasks, such as named entity recognition, information extraction, or parsing.

In an example, the application can chunk the data using a framework based on an LLM. One such framework is LangChain, which provides tools and abstractions to improve the customization, accuracy, and relevancy of the information an LLM generates. Using such a framework, the application can create chains, which are a series of automated actions from a query to an LLM's output. One such chain can take the chunked text and format it into a prompt, and then pass the prompt to the LLM. The application can do this at stage 316. The prompt to the LLM can specify the type of output. For example, the application can request output as structured data, such as a JSON or XML file.

At stage 318, the application can apply a JSON output parser. The JSON output parser can convert the JSON string into a fully structured JSON object. This conversion allows the extracted data to be integrated into an API, facilitating its utilization in downstream applications and systems. At 320, the application can convert the JSON output to a usable API format.

The stages beginning at stage 322 illustrate how the application can process line-items in nonstandard pages of the document. For example, in the context of government construction contracts, the document may include a Section B that enumerates all the supplies, data, and services that are intended to be acquired. Within Section B, there are contract line-items that specify the items to be delivered to the government and the services to be performed in relation to those line-items. These line-items may be associated with various reference numbers, such as ACRNs, CLINs, and SLINs. Line-items in a Section B can vary in format. For example, these line-items can include a table with or without borders, can be any number of columns or rows, can be any kind of font, and can include any length of text.

At stage 322, the application can segment the recognized text within the document into smaller units, or "chunks" (referred to hereinafter as "chunking"). This can help the LLM to contextually group the text more accurately. For example, LLMs have a token limit at which the model begins to lose context. A "token" refers to a unit of text that the model uses as input or output during its processing. Tokens can be words, parts of words (like subwords or morphemes), or even individual characters, depending on the tokenization method used by the model. To help maximize the LLMs context, the application can tokenize the extracted text by breaking down text into these smaller units (tokens/chunks) so that the model can process them.

At stage 324, the application can generate vector embeddings for each chunk/token. This process can involve feeding the chunked data into a vector embedding model at stage 326. Applying a vector embedding model is a sophisticated technique that transforms various objects, such as words, sentences, images, or graphs, into numerical representations. These numerical representations are situated within a continuous vector space, which is a mathematical construct that allows for the representation of data in a multi-dimensional format.

The primary objective of the vector embeddings is to encapsulate the semantic relationships between the objects in the chunked data. In other words, the embeddings aim to capture the underlying meanings and associations of the words, sentences, or other objects in a way that reflects their contextual relationships. For instance, words that are semantically similar or related in meaning should be positioned closer together in the vector space, while those that are unrelated should be farther apart.

By converting the text into this numerical form, the data becomes more amenable to analysis by machine learning algorithms. Machine learning algorithms, which are designed to identify patterns and make predictions based on data, can more effectively process and interpret the numerical representations provided by vector embeddings. This enables the application to perform various tasks, such as text classification, sentiment analysis, or information retrieval, with a higher degree of accuracy and efficiency. Converting the chunked data into embeddings allows the data to be fed into an LLM. This is because LLMs understand numerical representations and not raw text.

At stage 330, the application can create pointers for the vector embeddings. These pointers are essentially indices or references that serve as navigational tools, directing the application to specific vectors within an embedding matrix or space. An embedding matrix is a structured array where each row typically corresponds to a vector representation of an object. The concept of a pointer is akin to a bookmark or a map marker, providing a straightforward means to access the vector representation of a particular object, such as a word, image, or node in a graph, within the vast landscape of the vector space.

The pointers provide a reference for the application from the chunked data to their corresponding vector embeddings. For example, in the context of the current invention, these pointers play a critical role in bridging the gap between the raw, chunked text from the document and their numerical counterparts in the vector space. By establishing this link, the application can efficiently retrieve and manipulate the vector representations of specific text segments, enabling advanced text analysis and processing tasks. This mechanism enhances the application's ability to perform operations such as similarity comparison, clustering, or classification based on the semantic content of the text.

At stage 332, the application can begin retrieving the chunked data segments. In the context of a government form or contract, this can refer to Section B data or other data with a nonstandard form. The application can retrieve the chunked data using a first prompt template. A prompt template refers to a pre-defined structure or format used to create prompts for LLMs or other Artificial Intelligence ("AI") systems. Prompt templates are designed to provide a consistent and effective way to elicit specific responses or behaviors from the model.

Once the chunks are retrieved, the application proceeds to stage 334, where each chunk is individually fed into a first LLM. The data chunks are fed into the first LLM with their embeddings so that the first LLM can interpret the data. The use of an LLM is a key aspect of this stage, as LLMs are a type of artificial intelligence that has been trained on vast amounts of text data. They are capable of understanding and generating human-like text, making them highly effective for natural language processing tasks.

The first LLM can be trained to classify the data chunks and confirm which ones accurately represent Section B. This stage is critical as it ensures that only the pertinent chunks are selected for further analysis. The first LLM can be fine-tuned for government contract analysis, which makes it adept at identifying the structured and detailed content typical of Section B. As a result, the first LLM can output a refined set of chunks ready for line-item extraction.

At stage 336, the application can use a second prompt template to feed the refined set of chunks into a second LLM. The second prompt template can elicit the second LLM to extract specific information from the refined chunks. Table 1 below includes an example line-item prompt template that can be fed to the second LLM.

TABLE 1

```
{
  "items": [
    {
      "item": "[extracted item number]",
      "higher_item": "[related higher item, if applicable]",
      "type": "[item type]",
      "supplies_or_services": "[detailed description of the supplies or
      services]",
      "quantity": "[extracted quantity]",
      "unit": "[unit of measure]",
      "unit_price": "[price per unit]",
      "amount": "[total amount]",
      // Insert additional fields as necessary to capture complete line-item
      details
    }
    // Continue with additional line items formatted as JSON objects
  ]
}
```

The prompt template in TABLE 1 above elicits specific line-item fields for each chunked segment fed into the second LLM. For example, as shown in TABLE 1, the prompt elicits the second LLM to extract the item number, item type, detailed description, quantity, unit of measure, price per unit, total amount, and so on.

At stage 338, the second LLM can analyze the refined chunks based on the second prompt. The second LLM can be fine-tuned to have a deep understanding of government contract information. The second LLM can leverage its training to meticulously discern and extract critical data from the Section B content, focusing on line-item details such as item numbers, descriptions, quantities, units, unit pricing, etc. This fine-tuning enables the second LLM to accurately interpret the nuanced language and complex structures characteristic of government contracts, ensuring the extracted data is both precise and contextually relevant.

Post-analysis, the second LLM can format the data into a JSON string, which represents a preliminary structured and standardized format, capturing the intricate details of the line items. For example, Table 2 below includes an example of line-items from a Section B of a government contract.

TABLE 2

| Item | Supplies/Service | Quantity | Unit | Unit Price | Amount |
|---|---|---|---|---|---|
| 0001 | COBRA KING OPERATIONS & MAINTENANCE (O&M) - LABOR<br>Contractor shall provide all labor, management, and support needed to meet the requirements IAW the Performance Work Statement. The contractor shall bill this CLIN and the funded subCLINs affiliated, for all O&M effort on the COBRA KING mission platform identified in the PWS.<br>Product Service Code: R499 | 3,652 | Days | USD 22,943,126 | Firm Price USD 82,349,435 |
| 0003 | MOBILE SENSORS MANAGEMENT OFFICE (MSMO) O&M LABOR<br>Contractor shall provide all labor, management, and support needed to meet the requirements IAW the Performance Work Statement. The contractor shall bill this CLIN and | 3,652 | Days | USD 9,465,312 | Firm Price USD 33,382,134 |

TABLE 2-continued

| Item | Supplies/Service | Quantity | Unit | Unit Price | Amount |
|---|---|---|---|---|---|
| | the funded subCLINs affiliated, for all O&M effort on the Mobile Sensors MSPO identified in the PWS. Product Service Code: R499 | | | | |

Table 3 below includes an example JSON string for data from the line-items in Table 2 using the methods described herein. For example, if the data from Table 2 were from an actual contract uploaded to the application, the application can process the data using the methods described above, and the second LLM can output the JSON string in Table 3 below.

TABLE 3

```
"items": [
    {
        "item": "0001",
        "higher_item": "",
        "type": "CLIN",
        "supplies_or_services": "COBRA KING...",
        "quantity": "3,652",
        "unit": "Days",
        "unit_price": "USD 22,943,126",
        "amount": "Firm Price USD 82,349,435",
    },
    {
        "item": "0003",
        "higher_item": "",
        "type": "CLIN",
        "supplies_or_services": "MOBILE SENSORS...",
        "quantity": "3,652",
        "unit": "Days",
        "unit_price": "USD 9,465,312",
        "amount": "Firm Price USD 33,382,134",
    }
]
```

As shown in Tables 2 and 3, the application identifies the fields in the line-items from the contract and formats them into a JSON string. For example, the application extracts the “Item” column value into the “item” field, identifies that the line-item is a CLIN item type based on text in the “Supplies/Services” column, extracts the “Supplies/Services” column value into the “supplies_or_services” field, extracts the “Quantity” column value into the “quantity” field, extracts the “Unit” column value into the “unit” field, extracts the “Unit Price” column value into the “unit_price” field, and extracts the “Amount” column value into the “amount” field. The fields in the example above are merely examples and not meant to be limiting any way. Any fields known to be found in a contract document can be included in the JSON string.

At stage 340, the application can apply a JSON output parser. The JSON output parser can convert the JSON string into a fully structured JSON object. This conversion allows the extracted data to be integrated into an API, facilitating its utilization in downstream applications and systems. The conversion is illustrated at stage 320.

The stages beginning at stage 342 illustrate how the application can process the contract document as a whole rather than by line-item. For example, the stages described below can be used for general content analysis of the contract document or to calculate certain items in the contract, such as vendor down payments.

At stage 342, the application can chunk the text in the contract document. As described previously, chunking text refers to segmenting the recognized text within the document into smaller units.

At stage 344, the application can generate vector embeddings for each chunk. This can include feeding the chunked data into a vector embedding model at stage 326. The embedding model can output numerical values that encapsulate the semantic meanings of the chunked data in a vector space.

At stage 346, the application can use a prompt template to retrieve a desired clause. For example, a user can provide input to the application that defines the type of data the user is looking for. As an example, the user can search for clauses related to vendor down payments, deadlines, expiration dates, pricing, and so on. The application can insert the user search input into a prompt template that elicits an LLM to identify the corresponding data in the contract.

At stage 348, the application can feed the prompt template into a third LLM. The third LLM can be an LLM trained to identify clauses in a contract document based on user-provided definitions. The third LLM can output data chunks corresponding to clauses that satisfy the user-defined search.

At stage 350, the application can insert the outputted data chunks into a combine prompt template and, at stage 352, fed into a fourth LLM. The fourth LLM can be trained to identify specific types of clauses. In one example, the fourth LLM can differentiate between mandatory government clauses, Section B clauses, and other clause types. Government contracts contain mandatory clauses which afford the government special contractual rights, including, for example, the changes clause, the termination for convenience clause, and the default clause. In another example, the fourth LLM can extract clauses that may pertain to a specific work type or subcontractor work.

At stage 354, the application can apply a JSON output parser. The JSON output parser can convert the JSON string into a fully structured JSON object. The JSON object can then be presented to the user in a GUI.

Figure 4:
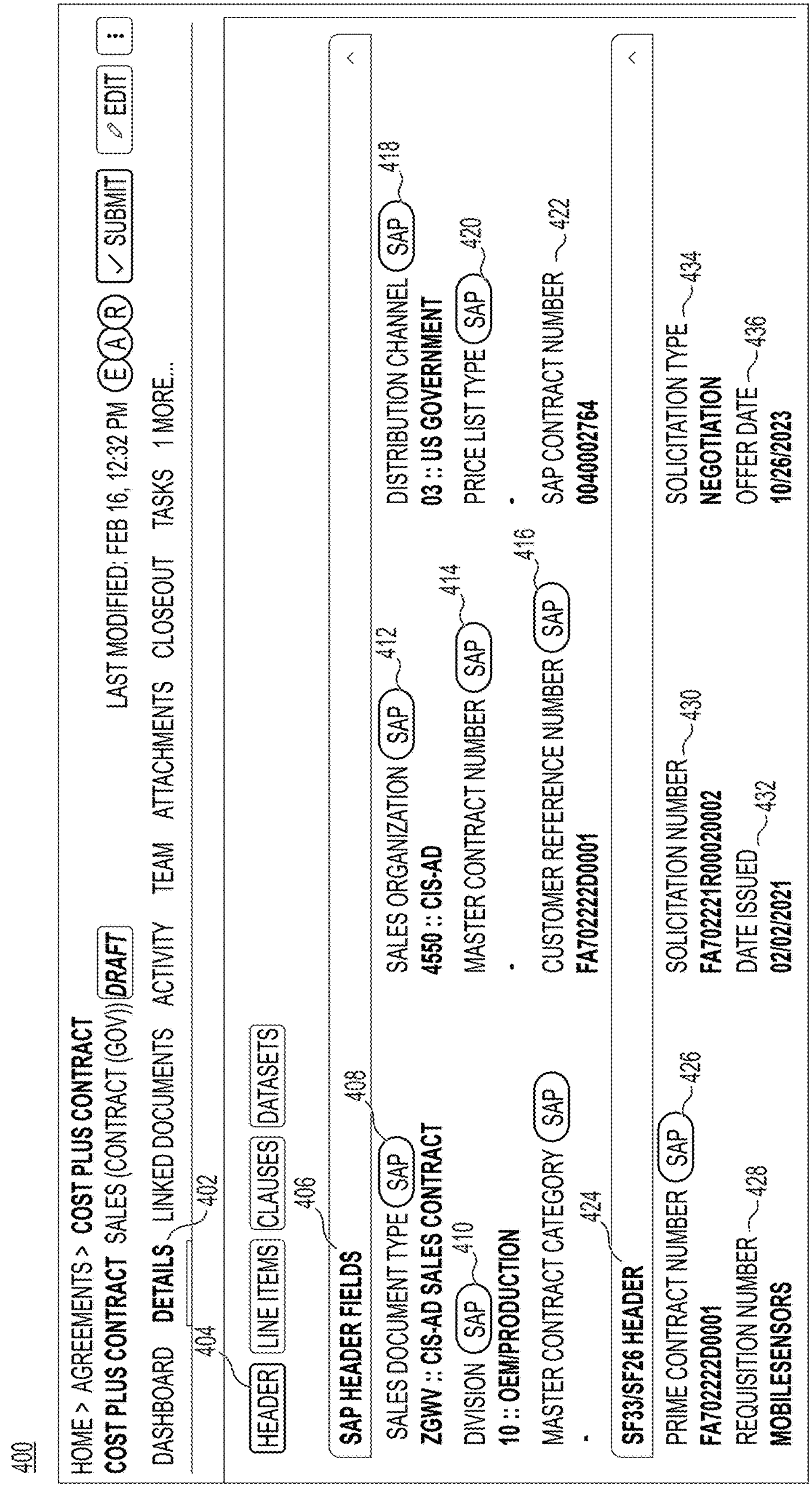
FIG. 4 is an example of a GUI for processing a contract document.
Figure 5:
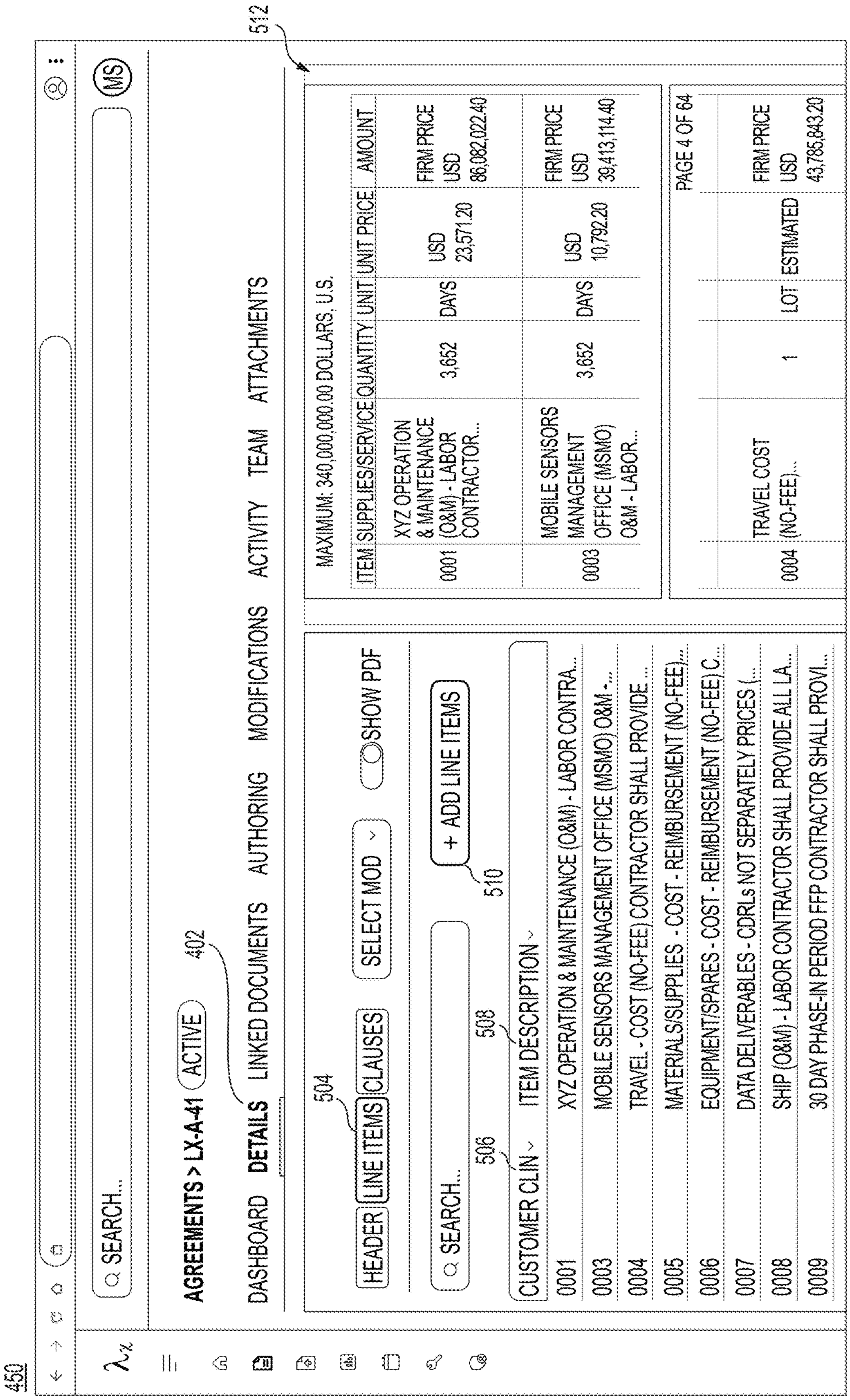
FIG. 5 is another example of the GUI for processing a contract document.

FIGS. 4 and 5 illustrate pages of an example a GUI 400 that displays data from a contract document that was processed using the methods described previously herein. For example, FIG. 4 is an illustration of a header section 404 of a details page 402 of the GUI 400. The header section 404 includes data processed from a document page with standard formatting. The header section 404 includes an ERP header field subsection 406 and a contract header subsection 424. The ERP header field subsection 406 includes data related to the document in relation to an ERP platform to which the contract is uploaded. For example, the ERP header field subsection 406 includes field related to a sales document type 408, a division 410, a sales organization 412, a master contract number 414, a customer reference number 416, a distribution channel 418, a price list type 420, and a contract number 422. In one example, information in the ERP header field subsection 406 can be populated from data received from the ERP platform.

The contract header subsection 424 includes fields for data extracted and interpreted from the header or first page in the contract document. For example, the contract header subsection 424 can include a prime contract number 426, a requisition number 428, a solicitation number 430, a date issued 432, a solicitation type 434, and an offer date 436. The information in the contract header subsection 424 can be populated from data obtained after processing and interpreting a contract document.

FIG. 5 is an illustration of a line-items section 504 of the details page 402. The line-items section 504 can include data processed and interpreted from pages of the contract that are not standard form pages, such as line-item pages. The line-item page 504 a list of the identified line items and information from each line item, such as the customer CLIN number 506 and a line-item description 508. The line-item page 504 can include a contract document window 512 that displays an image from the contract document corresponding to a selected line-item. For example, when a user selects a line-item, the line-item page 504 can display an image of the portion of the contract document corresponding to the selected line-item. The line-item page 504 can include a Add Line Items button 510 that allows a user to add line-items. This can be particularly useful in instances where the contract processing misses a line-item. Selecting the Add Line Items button 510 can cause the GUI 400 to display a window where a user can manually input information related to the missing line-item. The GUI 400 can also allow a user to manually edit line-items that may not have been processed correctly.

Figure 6:
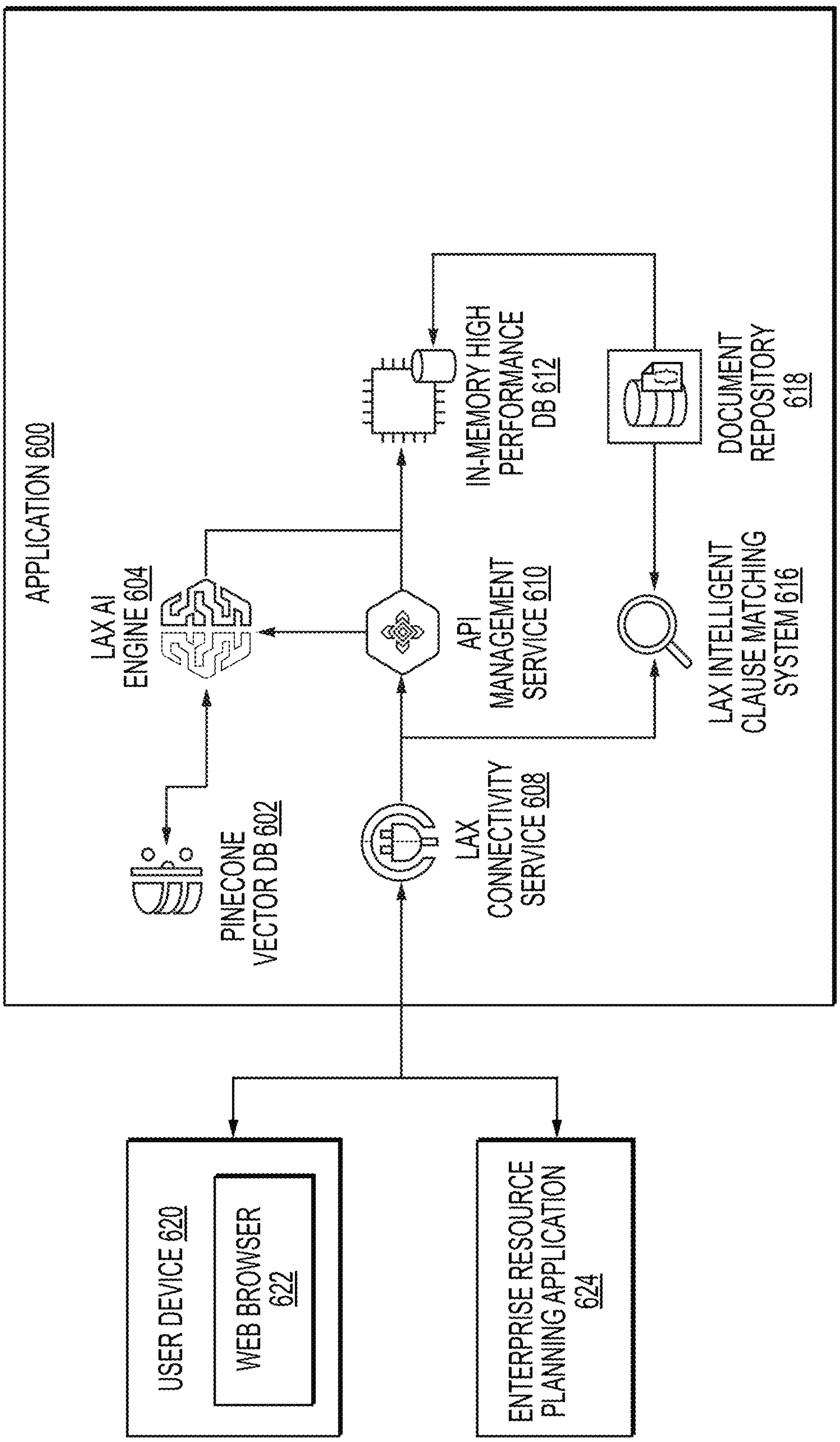
FIG. 6 is an illustration of an example system for processing a contract document.

FIG. 6 is an illustration of an example system for processing a contract document. A user can upload a contract document to an application 600 using a web browser 622 on a user device 620. The user device 620 can be one or more processor-based devices, such as a personal computer, tablet, or cell phone. The web browser 622 can be an application that accesses content on the internet. In an example, the document can be uploaded using a GUI that is a front-end interface for the application 600.

The web browser 622 can communicate with a connectivity service 608 of the application 600. The connectivity service 608 can handle communications of the application 600 with other devices, such as by sending and receiving API calls and hypertext transfer protocol secure ("HTTPS") calls. The connectivity service can pass API calls to an API management service 610. The API management service 610 can be responsible for handling all incoming and outgoing API calls. For example, the API management service 610 can extract data, such as requests and data files, from API calls and pass them to the appropriate services.

The application 600 can include a storage component 612 that stores data from contract documents. For example, the storage component can store uploaded contract documents, raw text extracted from contract documents, chunked data, vector embeddings, data classifications, and other processed data. In one example, the storage component 612 can be an internal memory component of the application 600. Alternatively, the storage component 612 can be an external memory component, such as a database.

The application 600 can include an AI engine 604 that processes AI models, such as LLMs. The AI engine 604 can communicate with a vector database 602. The vector database 602 can be a database that indexes and stores vector embeddings for fast retrieval and similarity search, with capabilities like create, read, update, and delete ("CRUD") operations, metadata filtering, horizontal scaling, and serverless. The AI engine 604 can handle requests for running data through LLMs and store the results in the storage component 612.

The application 600 can include a clause matching system 616 that matches clauses in uploaded documents to known clause types. For example, known contracts and contract types can be stored in a document repository 618. In one example, the clause matching system 616 can train an LLM using the contracts in the document repository 618. In another example, the clause matching system 616 can compare processed data from uploaded documents to known documents to identify matching types.

The application 600 can provide processed data from uploaded contracts to an ERP application 624. The ERP application 624 can be an external software application that helps organizations automate and manage core business processes. The application 600 can process the contract data using the methods described previously herein and format the processed data into an API call that the connectivity service 608 makes to the ERP application 624.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented is only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for parsing a contract document, comprising:

receiving a digital file having an image with text;

parsing the text in the digital file;

segmenting the text into data chunks;

creating vector embeddings of the chunks;

identifying a contract document type;

retrieving a second prompt template corresponding to the document type; and inserting a first data chunk and corresponding vector embeddings into the second prompt template, wherein the first data chunk is fed into the first LLM using the second prompt template;

feeding and processing the first chunk and corresponding vector embeddings into a first large language model ("LLM"), wherein the first LLM outputs a classification of the first chunk;

inserting the first data chunk into a first prompt template corresponding to the classification;

feeding and processing the first prompt template into a second LLM that outputs a string with data, the data in the string being based on the first prompt template; and rendering the data in the string in a GUI.

2. The method of claim 1, wherein parsing the text comprises:

identifying the text from the digital file using optical character recognition; and converting the identified text to a machine-readable format.

3. The method of claim 1, wherein the text is segmented into chunks based on relative locations of the text in the digital file.

4. The method of claim 1, further comprising:

converting the string to a JavaScript Object Notation ("JSON") object; and sending the JSON object to an enterprise resource planning application.

5. The method of claim 1, wherein the classification of the first chunk is one of a Section B clause or a mandatory government clause.

6. The method of claim 1, wherein rendering the data in the string in the GUI includes displaying a list of line-items identified in the contract document.

7. A non-transitory, computer-readable medium containing instructions that, when executed by a hardware-based processor, causes the processor to perform operations for parsing a contract document, the operations comprising:

receiving a digital file having an image with text;

parsing the text in the digital file;

segmenting the text into chunks;

creating vector embeddings of the chunks;

identifying a contract document type;

retrieving a second prompt template corresponding to the document type; and inserting a first data chunk and corresponding vector embeddings into the second prompt template, wherein the first data chunk is fed into the first LLM using the second prompt template;

feeding and processing the first chunk and corresponding vector embeddings into a first large language model ("LLM"), wherein the first LLM outputs a classification of the first chunk;

inserting the first data chunk into a first prompt template corresponding to the classification;

feeding and processing the first prompt template into a second LLM that outputs a string with data, the data in the string being based on the first prompt template; and rendering the data in the string in a GUI.

8. The non-transitory, computer-readable medium of claim 7, wherein parsing the text comprises:

identifying the text from the digital file using optical character recognition; and converting the identified text to a machine-readable format.

9. The non-transitory, computer-readable medium of claim 7, wherein the text is segmented into chunks based on relative locations of the text in the digital file.

10. The non-transitory, computer-readable medium of claim 7, the stages further comprising:

converting the string to a JavaScript Object Notation ("JSON") object; and sending the JSON object to an enterprise resource planning application.

11. The non-transitory, computer-readable medium of claim 7, wherein the classification of the first chunk is one of a Section B clause or a mandatory government clause.

12. The non-transitory, computer-readable medium of claim 7, wherein rendering the data in the string in the GUI includes displaying a list of line-items identified in the contract document.

13. A system for parsing a contract document, comprising:

a memory storage including a non-transitory, computer-readable medium comprising instructions; and a hardware-based processor that executes the instructions to carry out stages comprising:

receiving a digital file having an image with text;

parsing the text in the digital file;

segmenting the text into chunks;

creating vector embeddings of the chunks;

identifying a contract document type;

retrieving a second prompt template corresponding to the document type; and inserting the first data chunk and corresponding vector embeddings into the second prompt template, wherein the first data chunk is fed into the first LLM using the second prompt template;

feeding and processing the first chunk and corresponding vector embeddings into a first large language model ("LLM"), wherein the first LLM outputs a classification of the first chunk;

inserting the first data chunk into a first prompt template corresponding to the classification;

feeding and processing the first prompt template into a second LLM that outputs a string with data, the data in the string being based on the first prompt template; and rendering the data in the string in a GUI.

14. The system of claim 13, wherein parsing the text comprises:

identifying the text from the digital file using optical character recognition; and converting the identified text to a machine-readable format.

15. The system of claim 13, wherein the text is segmented into chunks based on relative locations of the text in the digital file.

16. The system of claim 13, the stages further comprising:

converting the string to a JavaScript Object Notation ("JSON") object; and sending the JSON object to an enterprise resource planning application.

17. The system of claim 13, wherein the classification of the first chunk is one of a Section B clause or a mandatory government clause.

* * * * *